(12) United States Patent
Kozicki (10) Patent No.: US 12,447,767 B2
(45) Date of Patent: Oct. 21, 2025

(54) DENDRITE FORMATION FOR SECURE TAGGING USING MULTI-FLUID SYSTEMS

(71) Applicant: Arizona Board of Regents on behalf of Arizona State University, Scottsdale, AZ (US)

(72) Inventor: Michael N. Kozicki, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 73 days.

(21) Appl. No.: 18/040,723

(22) PCT Filed: Aug. 6, 2021

(86) PCT No.: PCT/US2021/045111
§ 371 (c)(1),
(2) Date: Feb. 6, 2023

(87) PCT Pub. No.: WO2022/032199
PCT Pub. Date: Feb. 10, 2022

(65) Prior Publication Data
US 2023/0331025 A1    Oct. 19, 2023

Related U.S. Application Data

(60) Provisional application No. 63/062,165, filed on Aug. 6, 2020.

(51) Int. Cl.
*B42D 25/36* (2014.01)
*B42D 25/373* (2014.01)
(Continued)

(52) U.S. Cl.
CPC ......... *B42D 25/405* (2014.10); *B42D 25/373* (2014.10); *B42D 25/387* (2014.10); *B42D 25/425* (2014.10)

(58) Field of Classification Search
CPC ..... B42D 25/36; B42D 25/373; B42D 25/405
See application file for complete search history.

(56) References Cited

U.S. PATENT DOCUMENTS

| 4,551,210 A | 11/1985 | Parthasarathi |
| 5,751,308 A | 5/1998 | Gandy et al. |

(Continued)

FOREIGN PATENT DOCUMENTS

| WO | WO 2019/211377 | 11/2019 |
| WO | WO 2020/117950 | 6/2020 |

(Continued)

OTHER PUBLICATIONS

Andria. Exploring Dendritic Painting. Drawing Near The Block of Studio 791. May 16, 2016 . retrieved from https://andria-drawingnear.blogspot.com/2016/05/exploring-dendritic-painting.html (Year: 2016).*

(Continued)

*Primary Examiner* — Cachet I Proctor
(74) *Attorney, Agent, or Firm* — Fish & Richardson P.C.

(57) ABSTRACT

Forming a unique stochastically branching pattern includes providing a first fluid between a surface of a first substrate and a surface of a second substrate and introducing a second fluid between the surface of the first substrate and the surface of the second substrate. The second fluid is in direct contact with the first fluid at a formation temperature, and a viscosity of the first fluid at the formation temperature exceeds a viscosity of the second fluid at the formation temperature. The first substrate and the second substrate are separated to yield a unique stochastically branching pattern comprising the first fluid on the surface of the first substrate.

37 Claims, 3 Drawing Sheets

(51) Int. Cl.
*B42D 25/387* (2014.01)
*B42D 25/40* (2014.01)
*B42D 25/405* (2014.01)
*B42D 25/425* (2014.01)

(56) References Cited

U.S. PATENT DOCUMENTS

| | | | |
|---|---|---|---|
| 7,195,187 | B2 | 3/2007 | Albers |
| 8,328,349 | B2 | 12/2012 | Hook et al. |
| 9,390,920 | B2 | 7/2016 | Coe-Sullivan et al. |
| 9,430,733 | B2 | 8/2016 | Blondiaux et al. |
| 9,773,141 | B2 | 9/2017 | Kozicki |
| 9,836,633 | B2 | 12/2017 | Kozicki |
| 10,074,000 | B2 | 9/2018 | Kozicki |
| 10,810,731 | B2 | 10/2020 | Kozicki |
| 11,430,233 | B2 | 8/2022 | Kozicki |
| 11,598,015 | B2 | 3/2023 | Kozicki et al. |
| 2011/0254117 | A1 | 10/2011 | Kozicki |
| 2013/0063898 | A1 | 3/2013 | Schuett et al. |
| 2015/0147585 | A1* | 5/2015 | Schwarze ............ B29C 64/153 219/76.14 |
| 2016/0086001 | A1 | 3/2016 | Kozicki |
| 2016/0136992 | A1* | 5/2016 | Mai ................ B42D 25/36 428/206 |
| 2018/0088059 | A1 | 3/2018 | Kozicki |
| 2018/0286035 | A1* | 10/2018 | Kozicki ............... G07D 7/2033 |
| 2021/0157888 | A1 | 5/2021 | Kozicki |
| 2022/0027620 | A1* | 1/2022 | Kozicki ................ G06V 20/80 |
| 2023/0326009 | A1 | 10/2023 | Kozicki |
| 2023/0377115 | A1 | 11/2023 | Kozicki |
| 2023/0394857 | A1 | 12/2023 | Kozicki |

FOREIGN PATENT DOCUMENTS

| | | |
|---|---|---|
| WO | 2023069471 | 4/2023 |
| WO | 2023225399 | 11/2023 |

OTHER PUBLICATIONS

International Search Report and Written Opinion in PCT/US2021/045111 dated Jan. 11, 2022, 14 pages.
Partial Supplementary European Search Report in European Appln No. 21852474.2, mailed on Aug. 20, 2024, 13 pages.
P. G. Saffman and G. I. Taylor (1958) "The penetration of a fluid into a porous medium or hele-shaw cell containing a more viscous liquid," Proceedings of the Royal Society of London. Series A. Mathematical and Physical Sciences, vol. 245, No. 1242, p. 312-329. DOI: 10.1098/rspa. 1958.0085.
R. Chuoke, P. van Meurs, and C. van der Poel (1959) "The instability of slow, immiscible, viscous liquid-liquid displacements in permeable media," Transactions of the AIME, vol. 216, No. 01, p. 188-194.
L. Paterson (1981) "Radial fingering in a hele shaw cell," Journal of Fluid Mechanics, vol. 113, p. 513-529.
J.-D. Chen (1989) "Growth of radial viscous fingers in a hele-shaw cell," Journal of Fluid Mechanics, vol. 201, No. 1, p. 223-242.
M. J. Shelley, F.-R. Tian, and K. Wlodarski (1997) "Hele-Shaw flow and pattern formation in a time-dependent gap," Nonlinearity, vol. 10, No. 6, p. 1471-1495.
T. Dutta, S. Kabiraj, and S. Tarafdar (2002) "Simulation of hierarchical viscous fingering pattern in lifting hele-shaw cell," arXiv:cond-mat/0212544, arXiv: cond-mat/0212544. [Online]. Available: http://arxiv.org/abs/cond-mat/0212544, 14 pages.
S. Sinha, S.K. Kabiraj, T. Dutta, and S. Tarafdar (2003) "Radially interrupted viscous fingers in a lifting Hele-Shaw cell," Eur. Phys. J. B 36, 297-300, DOI: 10.1140/epjb/e2003-00347-4.
M. B. Amar and D. Bonn (2005) "Fingering instabilities in adhesive failure," Physica D: Nonlinear Phenomena, vol. 209, No. 1-4, p. 1-16.
A. Lindner, D. Derks, and M. J. Shelley (2005) "Stretch flow of thin layers of newtonian liquids: Fingering patterns and lifting forces," Physics of Fluids, vol. 17, No. 7, 072107, 14 pages.
T. Kim, J. Sewall, A. Sud, and M. C. Lin (2007) "Fast simulation of Laplacian growth," IEEE Computer Graphics and Applications, vol. 27, No. 2, p. 68-76.
J. Nase, D. Derks, and A. Lindner (2011) "Dynamic evolution of fingering patterns in a lifted hele-shaw cell," Physics of Fluids, vol. 23, No. 12, 123101, 12 pages.
T. ul Islam & P.S. Gandhi (2016) "Fabrication of multscale fractal-like structures by controlling fluid interface instability," Scientific Reports, 6:37187, DOI: 10.1038/srep37187 9 pages.
O. Alekseev and M. Mineev-Weinstein (2017) "Theory of stochastic Laplacian growth," Journal of Statistical Physics, vol. 168, No. 1, p. 68-91.
T. ul Islam & P.S. Gandhi (2017) "Spontaneous fabrication of three-dimensional multiscale fractal structures using Hele-Shaw cell," Journal of Manufacturing Science and Engineering, vol. 139, 031007-1, 6 pages.
B.S. Kale and K. Bhole (2019) "Parametric Analysis for forming meso fractals from nanoparticle seeded resin in Hele Shaw cell," IOP Conf. Series: Materials Science and Engineering 577, 012154, doi: 10.1088/1757-899X/577/1/012154, 9 pages.
P. Brumm, H.M. Sauer and E. Dörsam (2019) "Scaling Behavior of Pattern Formation in the Flexographic Ink Splitting Process," Colloids Interfaces, 3, 37; doi: 10.3390/colloids3010037, 16 pages.
S. Brulin, I.V. Roisman, and C. Tropea (2020) "Fingering instability of a viscous liquid bridge stretched by an accelerating substrate," J. Fluid Mech., vol. 899, A1, doi:10.1017/jfm.2020.422, 21 pages.
Q. Zhang, M.A. Amooie, M.Z. Bazant, and I. Bischofberger (2004) "Spontaneous growth morphology and symmetry selection of interfacial instabilities in anisotropic environments," arXiv:2004.02371v1 [physics.flu-dyn]), 9 pages.
Vimeo.com [online], "Hele-Shaw cell experiments," Apr. 10, 2011, retrieved on Nov. 7, 2023, retrieved from URL <https://vimeo.com/22212386>, 3 pages [Video Submission].
Twitter.com [online], "The branches form as a less viscous fluid (air) displaces a more viscous fluid (paint) when the glass plates separate," Jun. 24, 2018, retrieved on Nov. 7, 2023, retrieved from URL <https://twitter.com/i/status/1010982033554857985>, 2 pages.

* cited by examiner

DENDRITE FORMATION FOR SECURE TAGGING USING MULTI-FLUID SYSTEMS

CROSS-REFERENCE TO RELATED APPLICATION

This application is a National Stage Application of International Application No. PCT/US2021/045111, filed Aug. 6, 2021, which claims the benefit of U.S. Patent Application No. 63/062,165 entitled "DENDRITE FORMATION FOR SECURE TAGGING USING MULTI-FLUID SYSTEMS" and filed on Aug. 6, 2020, both of which are incorporated herein by reference in their entirety.

TECHNICAL FIELD

This invention relates to systems and methods for forming unique dendritic identifiers using multi-fluid systems.

BACKGROUND

To ensure the safety of supply chains and corresponding networks essential to health and wellbeing, the information therein must be impervious to corruption. Blockchain and hardware-based encryption can inure data systems to errors and malicious action, but the chain of trust is only as strong as its weakest link. In most supply chains, the weak link is a non-secure connection between the items in the channel and their corresponding information in the database, typically in the form of labels with machine-readable symbols (barcodes, etc.). However, these labels are easily removed from genuine articles or copied and applied to fake or substandard items to misrepresent origin and quality.

SUMMARY

To harden critical supply chains from corruption, an incorruptible physical identifier that securely links items and information is needed. This incorruptible physical identifier is preferably unclonable and resistant to tampering, including physical alteration and removal and reuse. In addition, the identifier is preferably unique, such that an unambiguous mapping between each item and its corresponding information in the database can be achieved. This unambiguous mapping further confounds counterfeiting and allows hyper-specific or tightly targeted information to reach the consumer.

Dendrites are intricate branching patterns that possess a singular set of minutiae for every instance of formation. No two dendrites are the same, much like fingerprints or the patterns in the retina of the eye as used for the identification of people. The pattern variations in dendrites arise from the mechanisms involved in their formation process so that individuality and high security result. The number of possible patterns depends at least in part on the fractal dimension of the shape (related to its complexity and density).

Some embodiments described in the disclosure are provided below.

Embodiment 1 is a method for forming a unique stochastically branching pattern, the method comprising:
 providing a first fluid between a surface of a first substrate and a surface of a second substrate;
 introducing a second fluid between the surface of the first substrate and the surface of the second substrate, wherein the second fluid is in direct contact with the first fluid at a formation temperature, and a viscosity of the first fluid at the formation temperature exceeds a viscosity of the second fluid at the formation temperature; and
 separating the first substrate and the second substrate to yield a unique stochastically branching pattern comprising the first fluid on the surface of the first substrate.

Embodiment 2 is a method of embodiment 1, wherein the formation temperature is room temperature.

Embodiment 3 is a method of embodiment 1 or 2, wherein providing the first fluid between the first substrate and the second substrate comprises:
 disposing the first fluid on the surface of the first substrate; and
 contacting the first fluid with the surface of the second substrate.

Embodiment 4 is a method of embodiment 3, wherein disposing the first fluid on the surface of the first substrate comprises dispensing the first fluid from a nozzle or through a template or applying the first fluid on the surface of the first substrate with a rotogravure.

Embodiment 5 is a method of any of embodiments 1 through 4, further comprising spreading the first fluid on the surface of the first substrate before introducing the second fluid.

Embodiment 6 is a method of any of embodiments 1 through 5, wherein the first fluid is in direct contact with the surface of the first substrate and the surface of the second substrate.

Embodiment 7 is a method of any of embodiments 1 through 6, wherein the surface of the first substrate and the surface of the second substrate at least partially confine the first fluid, and the surface of the first substrate and the surface of the second substrate are separated by the first fluid at a region between the surface of the first substrate and the surface of the second substrate, thereby allowing the second fluid to penetrate the first fluid at the region.

Embodiment 8 is a method of any of embodiments 1 through 7, wherein separating the first substrate and the second substrate comprises increasing a distance between an edge of the first substrate and an edge of the second substrate such that the region translates away from the first edge of the first substrate and the first edge of the second substrate.

Embodiment 9 is a method of any of embodiments 1 through 8, wherein introducing the second fluid between the surface of the first substrate and the surface of the second substrate comprises injecting the second fluid under pressure between the surface of the first substrate and the surface of the second substrate.

Embodiment 10 is a method of any of embodiments 1 through 9, wherein separating the first substrate and the second substrate forms a mirror image of the stochastically branching pattern comprising the first fluid on the surface of the second substrate.

Embodiment 11 is a method of any of embodiments 1 through 10, further comprising solidifying the unique stochastically branching pattern on the surface of the first substrate, the second substrate, or both.

Embodiment 12 is a method of any of embodiments 1 through 11, wherein solidifying the unique stochastically branching pattern comprises removing a solvent from the first fluid on the surface of the first substrate.

Embodiment 13 is a method of any of embodiments 1 through 12, wherein a maximum dimension of the unique stochastically branching pattern is in a range of 5 mm to 5 cm.

Embodiment 14 is a method of any of embodiments 1 through 13, wherein the unique stochastically branching pattern has a variable height with respect to the surface of the first substrate.

Embodiment 15 is a method of any of embodiments 1 through 14, wherein the first substrate is an item.

Embodiment 16 is a method of embodiment 15, wherein the item is a label or a package.

Embodiment 17 is a method of any of embodiments 1 through 16, wherein the first substrate is flexible.

Embodiment 18 is a method of any of embodiments 1 through 17, wherein the surface of the first substrate and the surface of the second substrate are curved.

Embodiment 19 is a method of any of embodiments 1 through 17, wherein the surface of the first substrate and the surface of the second substrate are substantially planar.

Embodiment 20 is a method of any of embodiments 1 through 19, wherein the surface of the first substrate, the surface of the second substrate, or both have a root mean square surface roughness of 50 μm or less or 1 μm or less.

Embodiment 21 is a method of any of embodiments 1 through 20, wherein the first fluid is in direct contact with protrusions, recessions, or both in the surface of the first substrate, the surface of the second substrate, or both.

Embodiment 22 is a method embodiment 21, wherein the protrusions, the recessions, or both form a pattern in the surface of the first substrate, the surface of the second substrate, or both.

Embodiment 23 is a method of any of embodiments 1 through 22, wherein the first fluid comprises a gel, an oil, a polymer, or polymerizable monomers.

Embodiment 24 is a method of embodiment 23, wherein the first fluid comprises a suspension of polymeric particles in water.

Embodiment 25 is a method of any of embodiments 1 through 24, wherein the first fluid is optically transparent.

Embodiment 26 is a method of any of embodiments 1 through 25, wherein the first fluid fluoresces under ultraviolet light.

Embodiment 27 is a method of any of embodiments 1 through 26, wherein the first fluid comprises electrically conductive material.

Embodiment 28 is a method of any of embodiments 1 through 27, wherein the first fluid contains particles that reflect light.

Embodiment 29 is a method of any of embodiments 1 through 28, wherein the first fluid is a food safe material.

Embodiment 30 is a method of embodiment 29, wherein the first fluid comprises one or more of glycerin, gelatin, wax, and polyvinyl alcohol.

Embodiment 31 is a method of any of embodiments 1 through 30, wherein a contact angle of the first fluid on the surface of the first substrate is in a range of 60° to 70°.

Embodiment 32 is a method of any of embodiments 1 through 31, wherein the second fluid comprises an organic solvent.

Embodiment 33 is a method of embodiment 32, wherein the organic solvent comprises an alcohol.

Embodiment 34 is a method of any of embodiments 1 through 31, wherein the second fluid comprises air.

Embodiment 35 is a method of embodiment 34, wherein the second fluid is air.

Embodiment 36 is a method of any of embodiments 1 through 34, wherein one or both of the first fluid comprises a colorant, the second fluid comprises a colorant, or both.

Embodiment 37 is a method of any of embodiments 1 through 36, wherein an interfacial tension between the first fluid and the second fluid is less than about 40 mJ/m$^2$ at the formation temperature.

Embodiment 38 is a method of any of embodiments 1 through 37, wherein the first fluid comprises an additive selected to change color based on exposure to light or heat.

Embodiment 39 is a method of any of embodiments 1 through 38, wherein the first fluid comprises an additive selected to change color based on exposure to a selected chemical, a selected biological agent, or radiation of a selected wavelength or wavelengths.

Embodiment 40 is an identifier pair comprising:
a first substrate;
a first stochastically branching pattern formed directly on a surface of the substrate;
a second substrate; and
a second stochastically branching pattern formed directly on a surface of the second surface,
wherein the second stochastically branching pattern is a mirror image of the first stochastically branching pattern.

Embodiment 41 is the identifier pair of embodiment 40, wherein features of the first stochastically branching pattern and features of the second stochastically branching pattern are identical in shape.

Embodiment 42 is the identifier pair of embodiment 40 or 41, wherein the first stochastically branching pattern and the second stochastically branching pattern comprise particles.

Embodiment 43 is the identifier pair of embodiment 42, wherein features of the first stochastically branching pattern and corresponding features of the second stochastically branching pattern differ in height relative to the surface of the first substrate and the surface of the second substrate, respectively.

Embodiment 44 is the identifier pair of embodiment 42 or 43, wherein one or more physical properties of the first stochastically branching pattern differ from the corresponding one or more physical properties of the second stochastically branching pattern based at least in part on an inhomogeneous distribution of the particles in the first stochastically branching pattern and the second stochastically branching pattern.

Embodiment 45 is the identifier pair of any one of embodiments 40 through 44, wherein the first stochastically branching pattern and the second stochastically branching pattern are food safe.

Embodiment 46 is the identifier pair of any one of embodiments 40 through 45, wherein the first stochastically branching pattern and the second stochastically branching pattern comprises acrylic.

Embodiment 47 is the identifier pair of embodiment 46, wherein the acrylic is steel-reinforced acrylic.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Methods and systems for fabricating unique stochastically branching patterns that are relatively dense with fine features and diffusion-limited aggregation (DLA)-like branching (e.g., Brownian trees) or densely branching morphologies (DBM) are disclosed. These unique stochastically branching patterns are referred to herein as "dendrites" or "dendritic structures." The dendrites are characterized by a plurality of members ("branches") extending away from a common point of the dendritic structure to form a stochastically branched arrangement of the members. Regions of the dendritic structure are stochastically self-similar to the entire dendritic structure.

The dendritic structures described herein are fabricated by providing a first fluid between a surface of a first substrate and a surface of a second substrate, and introducing a second fluid between the surface of the substrate and the surface of the second substrate. The first substrate can be an item (e.g., a piece of produce or a consumer good). In some cases, the first substrate is a label (e.g., a produce label) or packaging. Suitable materials for the first and second substrates include glass, plastic (e.g., polyethylene terephthalate), metal (e.g., stainless steel), synthetic paper, and resin-coated paper. The first substrate, the second substrate, or both can be flexible (including stretchable) or rigid. The surface of the first substrate and the surface of the second substrate can be curved or substantially planar. In some cases, the surface of the first substrate, the surface of the second substrate, or both have a root mean square surface roughness of about 50 µm or less (e.g., for metals) or about 1 µm or less (e.g., for plastics). In some cases, the surface of the first substrate, the second substrate, or both have protrusions, recessions, or both. The first fluid may be in direct contact with the protrusions, the recessions, or both. In some cases, the protrusions and recessions form a repeating pattern in the surface of the first substrate, the second substrate, or both. Patterning in one or both of the surface of the first substrate and the surface of the second substrate typically promotes more branching at the edges of the dendritic structure. Surface irregularities can overcome the surface tension smoothing effect and allow small branches to grow. Regular patterns in one or more of the two surfaces can force branching to occur symmetrically.

Providing the first fluid between the first substrate and the second substrate can include disposing the first fluid on the surface of the first substrate and contacting the first fluid with the surface of the second substrate. The first fluid can be spread on the surface of the first substrate before introducing the second fluid. In some cases, the first fluid is in direct contact with the surface of the first substrate and the surface of the second substrate. In certain cases, the surface of the first substrate, the surface of the second substrate, or both have been treated (e.g., etched with an acid or base) or coated (e.g., with an adhesive material) before the first fluid contacts the surface of the first substrate.

Disposing the first fluid on the surface of the first substrate can include dispensing the first fluid from a nozzle or through a template to yield one or more drops of the first fluid on the surface of the first substrate. The drops typically have a volume of a few microliters (e.g., about 2 µL) to a few hundred microliters (e.g., about 400 µL). The nozzle can be driven by pressure pulses. In some cases, when the nozzle is part of an inkjet head, the nozzle can be driven by a piezo-electric mechanism. A suitable template defines openings sized and positioned to form droplets of a selected volume and spacing. In some cases, the first fluid is deposited in a pattern on the surface of the first substrate with a rotogravure. Disposing the first fluid on the surface of the first substrate can include disposing a single drop or a multiplicity of drops of the first fluid on the surface of the substrate. The drops can be sized and spaced such that the resulting dendritic structures are discrete or contact (e.g., grow into) each other to yield a continuous array of dendritic structures.

The surface of the first substrate and the surface of the second substrate at least partially confine the first fluid, and the surface of the first substrate and the surface of the second substrate are separated by the first fluid at a region between the surface of the first substrate and the surface of the second substrate, thereby allowing the second fluid to penetrate the first fluid at the region. Introducing the second fluid between the surface of the first substrate and the surface of the second substrate can include injecting the second fluid under pressure between the surface of the first substrate and the surface of the second substrate. In some cases, the first substrate and the second substrate (with the first fluid therebetween) is submerged in the second fluid (e.g., air).

Separating the first substrate and the second substrate can be achieved by increasing a distance between an edge of the first substrate and an edge of the second substrate such that the region translates away from the first edge of the first substrate and the first edge of the second substrate. After the second fluid is introduced between the surface of the first substrate and the surface of the second substrate and penetrates the first fluid, the second fluid is in direct contact with the first fluid. At the temperature at which the dendritic structure is formed (the "formation temperature"), a viscosity of the first fluid exceeds a viscosity of the second fluid. In some cases, the formation temperature is room temperature (e.g., around 20° C. to 28° C.). Separating the first substrate and the second substrate results in the formation of a unique stochastically branching pattern (a dendritic structure) from the first fluid on the surface of the first substrate. A mirror image of the stochastically branching pattern on the surface of the first substrate is formed from the first fluid on the surface of the second substrate. The dendritic structures on the first substrate and the second substrate are identical in shape (e.g., outline) and can differ, for example, in height or other physical properties due at least in part to inhomogeneous distribution of any particles that may be in the dendritic structures.

The dendritic structures on the first substrate, the second substrate, or both can be solidified to yield dendritic structures having a maximum dimension in a range of about 5 mm to about 5 cm. Methods of drying include evaporation of a solvent (e.g., water) in the first fluid, hardening the first fluid via a hardener, curing the first fluid with ultraviolet radiation, crystallizing the first fluid, and freezing the first fluid.

In one example, the first fluid is an emulsion of acrylic polymer particles in water. A surfactant is typically used to keep the particles suspended. The emulsion is a clear viscous fluid that can be mixed with pigment to give it a tint (transparent) or deep color (opaque). The first fluid solidifies by the evaporation of water and the "fusing" of the particles when they contact each other. The resulting material has microscopic gaps between the fused particles which trap the pigment particles. This structure can also be used for trapping functional materials that react to light, radiation, heat, chemicals, biological elements, etc.

In another example, the first fluid includes a hardener and monomers, oligomers, polymeric particles, or a combination thereof. The hardener chemically fuses the polymeric particles together or polymerizes the monomers or oligomers. Suitable hardeners include amines (e.g., aliphatic amines, amine adducts, amine terminated polyamides). Two part (resin+hardener) systems solidify quickly and result in a solid/less porous material that is resistant to abrasion, moisture, and chemical attack. These dendritic structures can be used in harsh environments. Steel reinforced epoxy is a one example of this type of dendritic structure, as the resin binds strongly to the metal particles as well as to itself, forming a strong material that is resistant to mechanical forces and heat.

In yet another example, the first fluid includes UV curable resins. UV curable resins can include epoxy monomers that are polymerized by a photo-initiator under exposure to ultraviolet light. The dendritic structure solidifies quickly under UV illumination, with a short, controllable curing time.

In yet another example, a dendritic structure is solidified by crystallization. First fluids suitable for crystallization include honey and other sugar solutions (e.g., syrups). Crystallization can be achieved by heating after formation of the dendritic structure to promote crystallization.

In yet another example, solidification can be achieved by cooling (e.g., freezing) a dendritic structure from an elevated temperature. A suitable first fluid includes carnauba wax at a temperature of about 50-60° C. Subsequent cooling to room temperature results in solidification of the dendritic structure. In addition to carnauba wax, first fluids that include shellac and beeswax can also be solidified by cooling.

Figure 1:
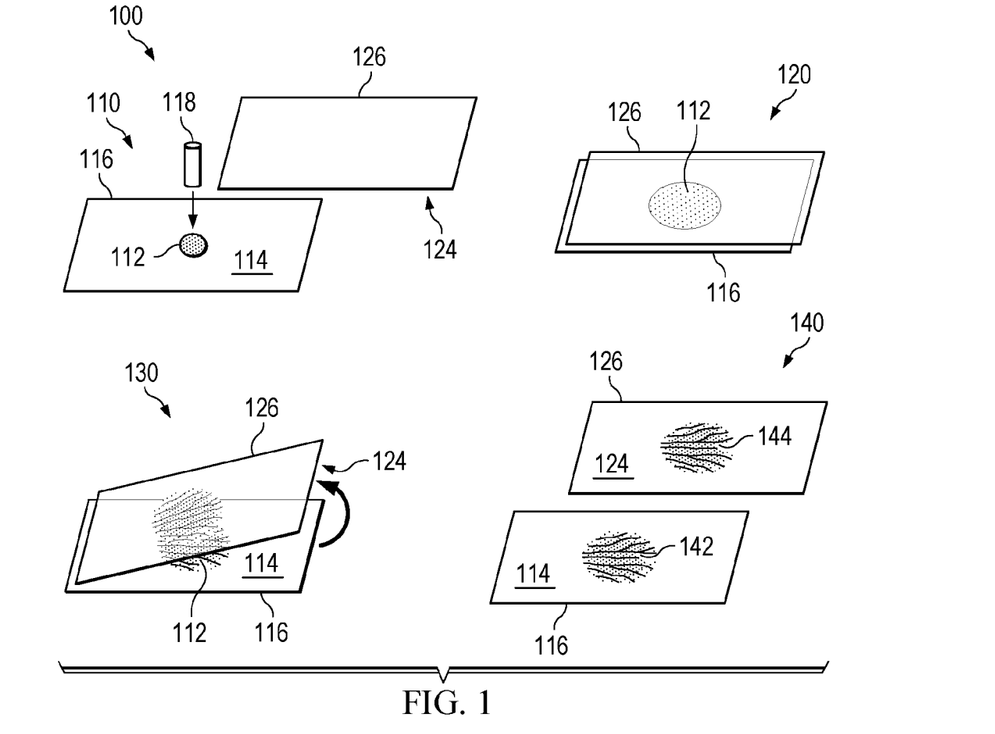
FIG. 1 depicts multi-fluid dendrite formation by interaction of fluids between two substrates.

FIG. 1 depicts process 100 for fabricating dendritic structures. In 110, first fluid 112 is disposed on surface 114 of first substrate 116 with nozzle 118. In 120, first fluid 112 is contacted with surface 124 of second substrate 126, and the first fluid spreads between surface 114 of first substrate 116 and surface 124 of second substrate 126. Surface 114 of first substrate 116 and surface 124 of second substrate 126 at least partially confine first fluid 112, and surface 114 of first substrate 116 and surface 124 of second substrate 126 are separated by first fluid 112 at a region between surface 114 of first substrate 116 and surface 124 of second substrate 126. In 130, first substrate 116 and second substrate 126 are separated (i.e., the distance between surface 114 of first substrate 116 and surface 124 of second substrate 126 is increased), thereby allowing the second fluid (e.g., air) to penetrate first fluid 112 at the region, such that the second fluid is in direct contact with first fluid 112. The temperature at which the dendritic structure is formed is referred to herein as the "formation temperature." A viscosity of first fluid 112 exceeds that of the second fluid at the formation temperature. In some cases, substrate 116 and second substrate 126 are submerged in or surrounded by the second fluid. In 140, first stochastically branched pattern 142 and second stochastically branched pattern 144 are shown on surface 114 of first substrate 116 and surface 124 of second substrate 126, respectively.

As depicted in FIG. 1, a thin layer of first (more viscous) fluid 112 is provided between surfaces 114 and 124 to form an assembly, and first fluid 112 is contacted with second (lower viscosity) fluid (e.g., air) at a first edge of the assembly such that a distance between surfaces 114 and 124 is on the order of a few microns to several hundred microns. Surfaces 114 and 124 are then separated from the first edge of the assembly to a second edge of the assembly in the presence of second fluid to allow the rapid ingress of the second fluid as a distance between surfaces 114 and 124 is increased, resulting in the formation of unique stochastically branching pattern 142 on surface 114 of first substrate 116 and unique stochastically branching pattern 144 on surface 124 of first substrate 126, respectively. Surfaces 114, 124 can be substantially planar and parallel to each other.

Figure 2:
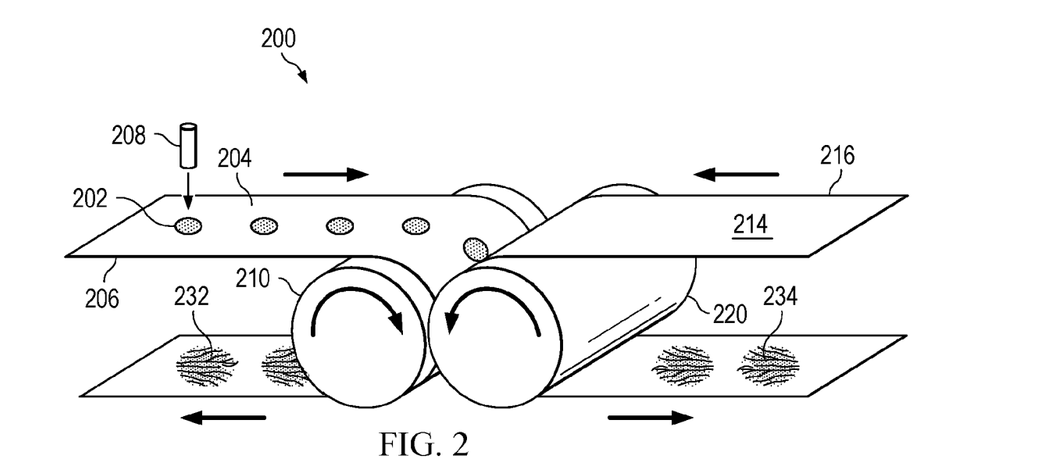
FIG. 2 depicts continuous formation of multi-fluid dendrite formation.

FIG. 2 depicts process 200 for continuous production of dendritic structures. First fluid 202 is disposed on surface 204 of first substrate 206 with nozzle 208, and first substrate 206 is advanced clockwise around first roller 210. First fluid 202 is compressed between surface 204 of first substrate 206 and surface 214 of second substrate 216 as first roller 210 rotates clockwise and second roller 220 rotates counter-clockwise. Substrates 206, 216 can be subjected to pressure in a range of about 50 g to about 5 kg between rollers 210, 220 (e.g., at a location where roller 210 contacts roller 220). As first substrate 206 and second substrate 216 advance about rollers 210 and 220, surface 204 and surface 214 are separated, yielding first stochastically branched pattern 232 on surface 204 of first substrate 206 and stochastically branched pattern 234 on surface 214 of second substrate 216.

In process 200, first fluid 202 is typically disposed on first substrate 204 in droplet sizes in a range of about 2 μL to about 400 μL. The droplets can be disposed on first substrate 204 in a line or in an array. A spacing between the droplets can be selected such that the resulting dendritic structures are discrete (e.g., discrete dendritic structures in a one-dimensional or two-dimensional array) or are continuous (e.g., intergrown dendritic structures). The directionality of pressure application as substrates 206, 216 advance through rollers 210, 220 results in a growth pattern (see, e.g., FIG. 3A) with branches in a limited angular orientation. In some cases, the branches are arranged within an arc of about 120°, about 110°, about 100° arc, or about 90° centered at a base of the dendritic structure.

Dendritic structures formed by the manual process depicted in FIG. 1 typically have a ridge height (distance from the surface of the substrate to the highest point on the dendritic structure, measured perpendicular to the surface of the substrate) greater than that of dendritic structures formed by the continuous process depicted in FIG. 2. This difference can be attributed at least in part to the greater pressure applied to the first fluid in the continuous process.

In embodiments depicted in FIGS. 1 and 2 as well as other embodiments, the first fluid can include a gel, an oil, a polymer (e.g., a solubilized polymer or an emulsion of polymer particles in a solvent), or polymerizable monomers (e.g., (meth)acrylate monomers). The first fluid can be solidified (e.g., dried or cured) by evaporation of the solvent or exposure to air or light (e.g., UV radiation). In some cases, the first fluid includes a hardener (e.g., a free radical initiator or a photoinitiator). Suitable first fluids include acrylic paint media and steel-reinforced acrylic. In one example, acrylic paint media is an emulsion of acrylic resin particles in a solvent (e.g., water). In some cases, the emulsion includes one or more additional types of polymeric particles. The acrylic resin and other polymer particles are generally insoluble in water. The emulsion typically includes one or more pigments and surfactants. As the water evaporates after formation of the dendritic structure, the polymeric particles are drawn closer, until they touch and fuse together. This coalescence and produces a honeycomblike pattern. Pigment particles are trapped in the honeycomb pattern, producing a paint film that is highly flexible with great adhesion.

In some cases, the first fluid is food safe. Examples of suitable food-safe materials include Generally Recognized as Safe (GRAS) substances, such as glycerin, gelatin, wax, and polyvinyl alcohol.

The first fluid is selected to have a contact angle on the surface of the first substrate in a range of 60° to 70°. In some cases, the first fluid is colorless. In certain cases, the first fluid can include a colorant to enhance visibility of the dendritic structure. In some cases, the first fluid is optically transparent. In some cases, the first fluid includes a fluorescent substance that fluoresces when irradiated with light (e.g., ultraviolet light). The first fluid can be electrically conductive or non-conductive.

Particulate matter can be combined with the first fluid prior to deposition or on the uncured first fluid after dendrite formation. The particulate matter can be in forms such as flakes or crystals. The particulate matter can be electrically conductive (e.g., metallic) or non-conductive. Examples of food-safe, non-conductive particles include crystals of sugar, salt, gelatin, or the like. A size of the particulate matter is typically in a range of about 1 µm to about 400 µm. In some cases, the particulate matter includes nanoscale aggregates. A density of the particulate matter in the first fluid (e.g., number of particles per microliter of fluid) is typically in a range of 10 to 10,000.

Examples of suitable second fluids include air or other gasses, organic solvents (e.g., acetone, hexane, and alcohols such as methanol, ethanol, and isopropanol), and penetrating oils (e.g., WD-40). The second fluid can be optically transparent. In some cases, the second fluid includes a colorant. The colorant may be the same as or different than a colorant present in the first fluid.

The first fluid, the second fluid, or both can independently include a colorant. In some cases, the first fluid, the second fluid, or both include a surfactant (e.g., detergent) to reduce surface tension. The first fluid can be a mixture of two or more fluids, and the second fluid can independently be a mixture of two or more second fluids, or both. The two or more fluids may be mixed to form a homogenous fluid before use.

The first and second fluids are typically selected to have a low interfacial tension (e.g., less than about 40 mJ/m$^2$). This limits the inhibition of small branches due to surface tension effects. A variety of dendritic morphologies can be created, based at least in part on properties of the first and second fluids and the rate of separation of the two surfaces (e.g., about 0.1 cm/s to about 250 cm/s). The rate of separation of the surfaces is a factor in dendrite morphology, with faster separation (greater than about 1 cm/s) leading to denser patterns (high fractal dimension, greater than about 1.5) and patterns that are more irregular (more like "diffusion limited aggregates" in shape).

In some cases, the first fluid has a viscosity in a range of about 0.5 Pa·s to about 10 Pa·s at room temperature. The viscosity of the first fluid is typically at least about 100 times greater than the viscosity of the second fluid at the formation temperature. The resulting dendritic structures have a high information density (i.e., a vast number of possible versions), and can be "read" (identified) with appropriate algorithms.

In general, a first fluid in the higher range of viscosity (greater than about 1 Pa·s) yields a three-dimensional dendritic structure with a variable thickness with respect to the surface on which it is formed. This variable thickness can be detected using low angle illumination, which will light up facets that are facing the light source to create bright features in the image. Different illumination directions will light up different facets, so the presence of a three dimensional pattern (rather than a two dimensional pattern) is apparent. The way that the first fluid separates when a distance between the surface of the first substrate and the surface of the second substrate are separated can also lead to unique topography in each pair of dendrites. That is, there can be subtle thickness variations along the length of each branch, increasing the difficulty of cloning of these patterns.

Dendritic structures fabricated as described herein can be functionalized by including one or more additives in the first fluid, and attaching the dendritic structure as a label on an item (e.g., produce, pharmaceuticals, etc.). In one example, an additive that changes color irreversibly when a particular temperature is exceeded can be used as an indicator that a cold chain has been broken. In another example, an additive that changes color irreversibly when the dendritic structure is exposed to light (e.g., for a selected length of time or at a selected wavelength) can be used as an indicator of exposure to light. Other additives include additives that change color irreversibly when the dendritic structure is exposed to water or a threshold humidity level, a selected type of radiation (e.g., gamma radiation, X-rays, etc.), specific chemicals (e.g., chorine), or biological agents (e.g., bacteria such as *E. coli*).

Processes described herein may be used to form an identifier pair including a first dendritic structure formed directly on a first surface and a second dendritic structure formed directly on the second surface. The second dendritic structure is a mirror image of the first dendritic structure. The first and second dendritic structures are identical in shape (e.g., outline) and can differ in other physical properties such as height (e.g., due to inhomogeneous particle distribution in the dendritic structures). This feature has utility in "two-key" applications, for example, where the dendrite shapes must match to allow a protected process to proceed.

Authenticating a stochastically branching pattern formed by processes describe herein can include measuring a height of each point of a first multiplicity of points on a first stochastically branching pattern from a surface from which the first stochastically branching pattern extends, comparing the height of each of the first multiplicity of points with a height of each of a second multiplicity of corresponding points on a second stochastically branching pattern, and assessing a difference in height between each corresponding point of the first multiplicity of points and the second multiplicity of points.

EXAMPLES

Figure 3A:
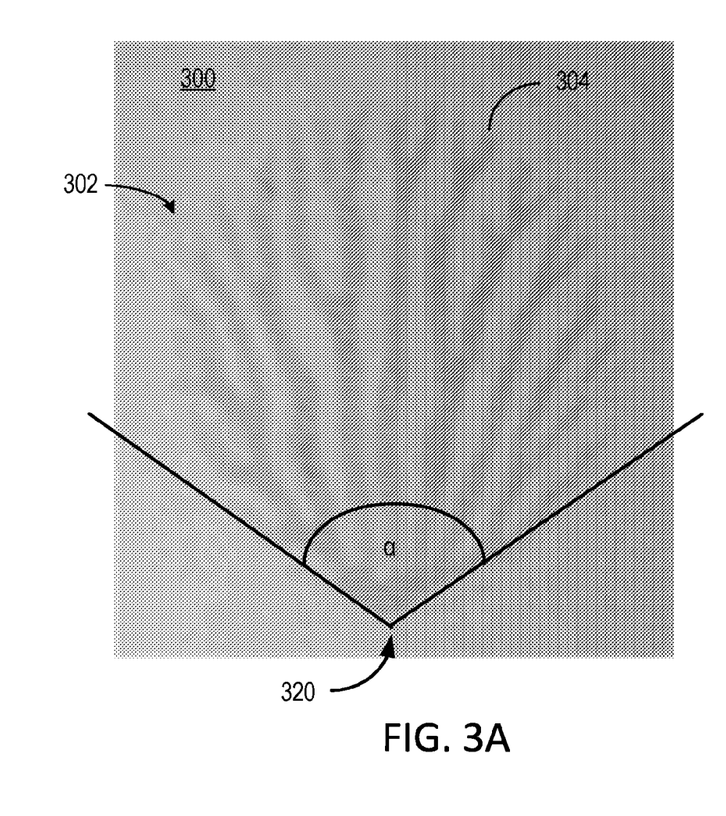
FIGS. 3A and 3B show examples of unique stochastically branching patterns formed by the process described with respect to FIG. 1.
Figure 3B:
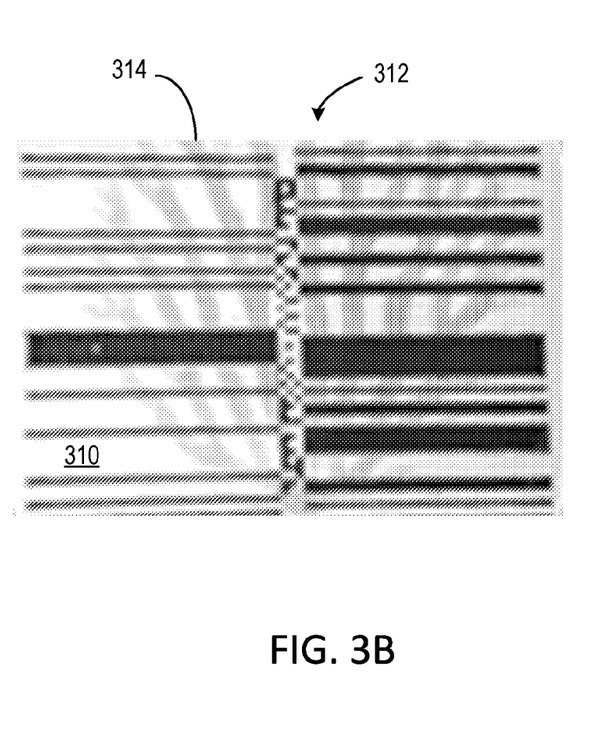

Example 1. Examples of dendritic structures formed by the process described with respect to FIG. 1 are shown in FIGS. 3A and 3B. The patterns in FIGS. 3A and 3B were formed by applying a uniform, thin film of blue colored glycerin, approximately 100 µl volume dispensed via pipette, between polyethylene terephthalate (PET) sheet 300 and polypropylene PLU label 310, and separating PET sheet 300 from PLU label 310 (from the top of the image to the bottom of the image) to yield unique stochastically branching pattern 302 on PET sheet 300 (FIG. 3A) and a mirror image 312 of unique stochastically branching pattern 302 on PLU label 310 (FIG. 3B). As shown in FIG. 3A, dendritic structures 302, 312 have branches 304, 314, respectively, in a limited angular orientation, with the branches are arranged within an arc α of about 120°, about 110°, about 100°, or about 90° centered at a base 320 of the dendritic structures.

The patterns were formed at room temperature and were allowed to dry at room temperature. Dendritic structure 312 can be referred to as a "watermark" on PLU label 310. Dendritic structures 302, 312 are identical in shape (i.e., mirror images of each other), and can differ in other properties (e.g., in height) due at least in part to an inhomogeneous distribution of particles in the dendritic structures PLU label 310 is readable through dendritic structure 312. When PLU label 310 is distorted or stretched (e.g., during removal from a piece of produce), dendritic structure 312 is altered (e.g., cracked). Alteration of dendritic structure 312 can provide evidence of use or tampering.

Example 2. A silver ink, 50 µl volume dispensed via pipette at room temperature, with a viscosity of about 4 Pa·s at room temperature was used as a first fluid. The resulting dendritic patterns had a height of several tenths of millimeters and were electrically conductive.

Example 3. The first fluid was a mixture of a fluorescent ink and clear glycerin-based material, approximately 100 µl volume dispensed via pipette at room temperature. The resulting dendritic structures were difficult to see under ambient light, but glowed blue or green (depending on the ink used) under ultraviolet illumination.

Example 4. The first fluid was a soluble gel (clear glycerin and surfactant with dye added), approximately 100 µl volume, and the resulting dendritic structures formed at room temperature and allowed to dry at room temperature were water soluble. Such dendrites are suitable for marking food items that are to be rinsed before consumption.

Figure 4:
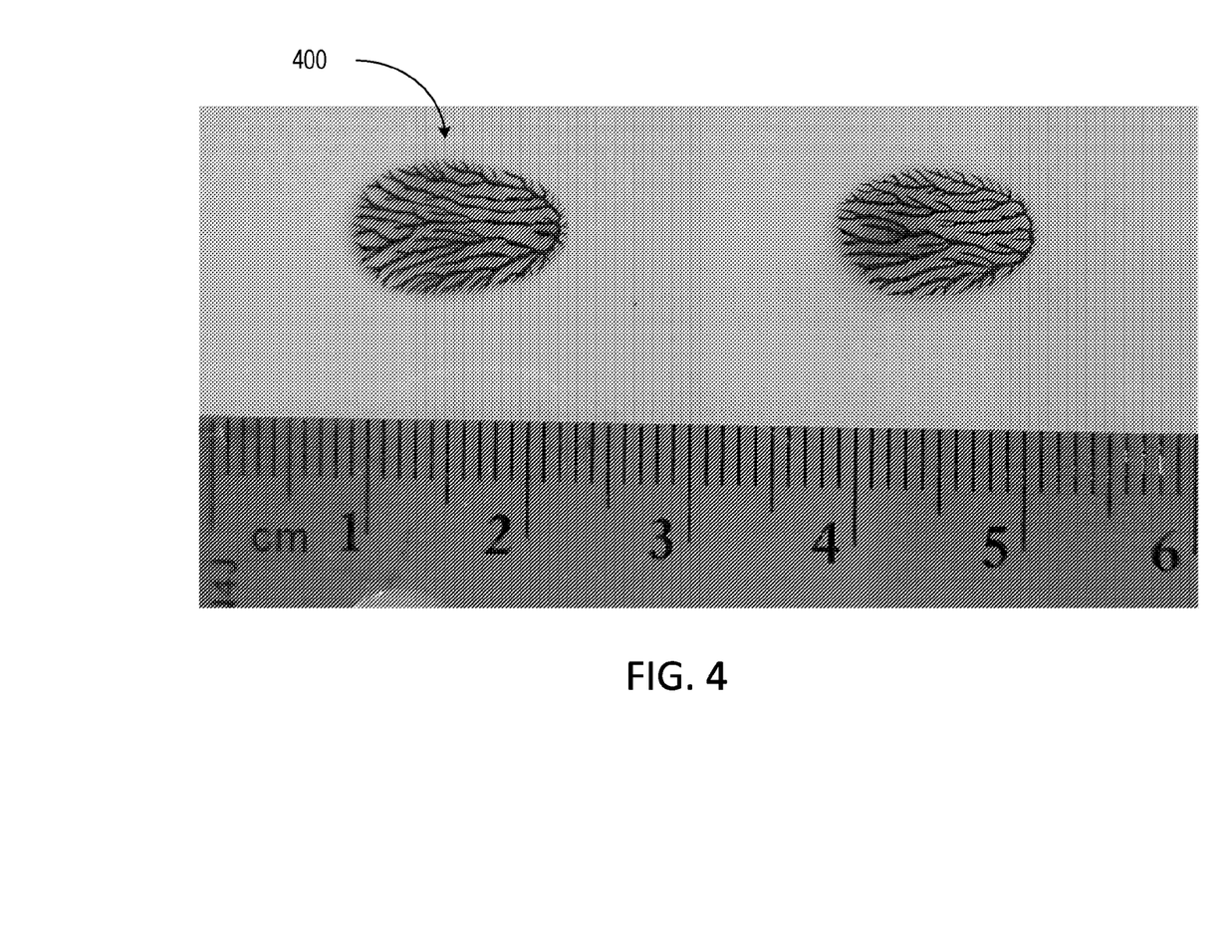
FIG. 4 shows dendritic structures formed from an acrylic emulsion in a continuous process.

Example 5. Dendritic structures 400, shown in FIG. 4, were formed by separating two plastic sheets with a thin film of an acrylic emulsion (first fluid) between the two PET sheets. The acrylic emulsion was a suspension of acrylic resin particles 0.05 to 0.5 µm in diameter in water (around 1 mg acrylic/µl of water) with a viscosity of about 3.4 Pa·s at room temperature and a contact angle on the PET substrate of about 61°. A black pigment was added to the emulsion for contrast. Each dendritic structure was produced using about 10 µl of the acrylic emulsion, with 1 kg press force and a printing speed of about 2.5 cm/s. As the sheets were pulled apart, air (second fluid) penetrated the acrylic emulsion to form the dendritic structures. As the water evaporated, the acrylic resin particles coalesced, thereby hardening the dendritic structures on each sheet of plastic. The resulting dendritic structures were about 1 cm in length with a ridge height of about 10 µm.

Example 6. The first fluid, around 100 µl of an acrylic monomer mixed with steel particles around 1 µm in diameter, was applied to a galvanized steel component and compressed by a sheet of PET at room temperature and then hardened using a crosslinking agent following introduction of the second fluid, thereby yielding a durable three-dimensional pattern on each of the two substrates.

Example 7. A thermochromic material comprising an organic leuco-dye mixture was mixed with acrylic resin (as described in Example 5), and dendrites formed on PET substrates as before. These dendrites went from dark tinted to clear above 83° F. and returned to their dark color once the material had cooled below this temperature.

Example 8. A phosphorescent material (zinc sulfide) was mixed with acrylic resin (as described in Example 5) and dendrites formed on PET substrates as before. The dendrites glowed for several minutes following the removal of a bright white light source.

Example 9. A moisture sensing material (silica gel with methyl violet) was mixed with acrylic resin (as described in Example 5) and dendrites formed on PET substrates as before. The dendrites changed from an orange tint to a green tint after being exposed to water for several minutes.

Example 10. Dendritic structures were formed by separating two plastic (PET) sheets with a thin film of an acrylic emulsion between the two sheets as in Example 5. Following solidification, the dendritic pattern had ridges with heights ranging from around 50 µm to around 200 µm.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method for forming a unique stochastically branching pattern, the method comprising:
    providing a first fluid between a surface of a first substrate and a surface of a second substrate;
    introducing a second fluid between the surface of the first substrate and the surface of the second substrate, wherein the second fluid is in direct contact with the first fluid at a formation temperature, and a viscosity of the first fluid at the formation temperature exceeds a viscosity of the second fluid at the formation temperature; and
    separating the first substrate and the second substrate to yield a unique stochastically branching pattern comprising the first fluid on the surface of the first substrate, wherein the first substrate is a label or a package.

2. The method of claim 1, wherein the formation temperature is room temperature.

3. The method of claim 1, wherein providing the first fluid between the first substrate and the second substrate comprises:
    disposing the first fluid on the surface of the first substrate; and
    contacting the first fluid with the surface of the second substrate.

4. The method of claim 3, wherein disposing the first fluid on the surface of the first substrate comprises dispensing the first fluid from a nozzle or through a template or applying the first fluid on the surface of the first substrate with a rotogravure.

5. The method of claim 1, further comprising spreading the first fluid on the surface of the first substrate before introducing the second fluid.

6. The method of claim 1, wherein the first fluid is in direct contact with the surface of the first substrate and the surface of the second substrate.

7. The method of claim 1, wherein the surface of the first substrate and the surface of the second substrate at least partially confine the first fluid, and the surface of the first substrate and the surface of the second substrate are separated by the first fluid at a region between the surface of the first substrate and the surface of the second substrate, thereby allowing the second fluid to penetrate the first fluid at the region.

8. The method of claim 7, wherein separating the first substrate and the second substrate comprises increasing a distance between an edge of the first substrate and an edge of the second substrate such that the region translates away from the first edge of the first substrate and the first edge of the second substrate.

9. The method of claim 1, wherein introducing the second fluid between the surface of the first substrate and the surface of the second substrate comprises injecting the second fluid under pressure between the surface of the first substrate and the surface of the second substrate.

10. The method of claim 1, wherein separating the first substrate and the second substrate forms a mirror image of the stochastically branching pattern comprising the first fluid on the surface of the second substrate.

11. The method of claim 10, further comprising solidifying the unique stochastically branching pattern on the surface of the first substrate, the second substrate, or both.

12. The method of claim 1, wherein solidifying the unique stochastically branching pattern comprises removing a solvent from the first fluid on the surface of the first substrate.

13. The method of claim 1, wherein a maximum dimension of the unique stochastically branching pattern is in a range of 5 mm to 5 cm.

14. The method of claim 1, wherein the unique stochastically branching pattern has a variable height with respect to the surface of the first substrate.

15. The method of claim 1, wherein the first substrate is flexible.

16. A method for forming a unique stochastically branching pattern, the method comprising:
provided a first fluid between a surface of a first substrate and a surface of a second substrate;
introducing a second fluid between the surface of the first substrate and the surface of the second substrate, wherein the second fluid is in direct contact with the first fluid at a formation temperature, and a viscosity of the first fluid at the formation temperature exceeds a viscosity of the second fluid at the formation temperature; and
separating the first substrate and the second substrate to yield a unique stochastically branching pattern comprising the first fluid on the surface of the first substrate, wherein the surface of the first substrate and the surface of the second substrate are curved.

17. The method of claim 1, wherein the surface of the first substrate and the surface of the second substrate are substantially planar.

18. The method of claim 1, wherein the surface of the first substrate, the surface of the second substrate, or both have a root mean square surface roughness of 50 μm or less or 1 μm or less.

19. The method of claim 1, wherein the first fluid comprises a gel, an oil, a polymer, or polymerizable monomers.

20. The method of claim 19, wherein the first fluid comprises a suspension of polymeric particles in water.

21. The method of claim 1, wherein the first fluid is optically transparent.

22. The method of claim 1, wherein the first fluid fluoresces under ultraviolet light.

23. The method of claim 1, wherein the first fluid contains particles that reflect light.

24. The method of claim 1, wherein a contact angle of the first fluid on the surface of the first substrate is in a range of 60° to 70°.

25. The method of claim 1, wherein the second fluid comprises an organic solvent.

26. The method of claim 25, wherein the organic solvent comprises an alcohol.

27. The method of claim 1, wherein the second fluid comprises air.

28. The method of claim 27, wherein the second fluid is air.

29. The method of claim 1, wherein the first fluid comprises a colorant, the second fluid comprises a colorant, or both.

30. The method of claim 1, wherein an interfacial tension between the first fluid and the second fluid is less than about 40 mJ/m² at the formation temperature.

31. The method of claim 1, wherein the first fluid comprises an additive selected to change color based on exposure to light or heat, a selected chemical, a selected biological agent, or radiation of a selected wavelength or wavelengths.

32. A method for forming a unique stochastically branching pattern, the method comprising:
providing a first fluid between a surface of a first substrate and a surface of a second substrate;
introducing a second fluid between the surface of the first substrate and the surface of the second substrate, wherein the second fluid is in direct contact with the first fluid at a formation temperature, and a viscosity of the first fluid at the formation temperature exceeds a viscosity of the second fluid at the formation temperature; and
separating the first substrate and the second substrate to yield a unique stochastically branching pattern comprising the first fluid on the surface of the first substrate, wherein the first fluid is in direct contact with protrusions, recessions, or both in the surface of the first substrate, the surface of the second substrate, or both.

33. The method of claim 32, wherein the protrusions, the recessions, or both form a pattern in the surface of the first substrate, the surface of the second substrate, or both.

34. A method for forming a unique stochastically branching pattern, the method comprising:
providing a first fluid between a surface of a first substrate and a surface of a second substrate;
introducing a second fluid between the surface of the first substrate and the surface of the second substrate, wherein the second fluid is in direct contact with the first fluid at a formation temperature, and a viscosity of the first fluid at the formation temperature exceeds a viscosity of the second fluid at the formation temperature; and separating the first substrate and the second substrate to yield a unique stochastically branching pattern comprising the first fluid on the surface of the first substrate, wherein the first fluid comprises electrically conductive material.

35. A method for forming a unique stochastically branching pattern, the method comprising:
providing a first fluid between a surface of a first substrate and a surface of a second substrate;
introducing a second fluid between the surface of the first substrate and the surface of the second substrate, wherein the second fluid is in direct contact with the first fluid at a formation temperature, and a viscosity of the first fluid at the formation temperature exceeds a viscosity of the second fluid at the formation temperature; and
separating the first substrate and the second substrate to yield a unique stochastically branching pattern comprising the first fluid on the surface of the first substrate, wherein the first fluid is a food safe material.

36. The method of claim 35, wherein the first fluid comprises one or more of glycerin, gelatin, wax, and polyvinyl alcohol.

37. A method for forming a unique stochastically branching pattern, the method comprising:
providing a first fluid between a surface of a first substrate and a surface of a second substrate;
introducing a second fluid between the surface of the first substrate and the surface of the second substrate, wherein the second fluid is in direct contact with the first fluid at a formation temperature, and a viscosity of the first fluid at the formation temperature exceeds a viscosity of the second fluid at the formation temperature; and
separating the first substrate and the second substrate to yield a unique stochastically branching pattern comprising the first fluid on the surface of the first substrate, wherein the first fluid comprises an additive selected to change color based on exposure to light or heat, a selected chemical, a selected biological agent, or radiation of a selected wavelength or wavelengths.

* * * * *